United States Patent
Lee et al.

(10) Patent No.: US 7,312,985 B2
(45) Date of Patent: Dec. 25, 2007

(54) COOLER OF NOTEBOOK PERSONAL COMPUTER AND FABRICATION METHOD THEREOF

(75) Inventors: Harrison Lee, Goonpo-si (KR); Ye Yong Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 628 days.

(21) Appl. No.: 10/382,512

(22) Filed: Mar. 7, 2003

(65) Prior Publication Data
US 2003/0161102 A1    Aug. 28, 2003

(30) Foreign Application Priority Data
Mar. 8, 2002  (KR) .................. 10-2002-0012505
Feb. 24, 2003 (KR) .................. 10-2003-0011469

(51) Int. Cl.
*H05K 7/20* (2006.01)
(52) U.S. Cl. ............... 361/687; 361/708; 165/122; 165/80.3
(58) Field of Classification Search ........ 361/679–683, 361/687–709; 165/80.2, 80.3, 80.4, 121–126, 165/140.33, 185, 104.26, 104.33, 104.21; 174/15.2; 312/223.1, 223.2; 415/177, 178, 415/213.1, 214.1
See application file for complete search history.

(56) References Cited

U.S. PATENT DOCUMENTS 3,703,763 A  * 11/1972 Berry .................. 228/172
5,334,236 A  *  8/1994 Sang et al. ............. 75/415
5,482,533 A  *  1/1996 Masuda et al. ........... 75/415
5,622,542 A  *  4/1997 Thomas et al. ........... 75/415
6,241,007 B1 *  6/2001 Kitahara et al. ......... 165/80.4
6,351,382 B1    2/2002 Nakanishi et al.
6,391,250 B1 *  5/2002 Wolfsgruber et al. ....... 419/2
6,397,618 B1 *  6/2002 Chu et al. ............. 62/259.2
6,411,508 B1 *  6/2002 Kang et al. ............ 361/695
6,487,076 B1 * 11/2002 Wang ................... 361/697
6,660,224 B2 * 12/2003 Lefebvre et al. .......... 419/2
6,752,201 B2 *  6/2004 Cipolla et al. .......... 165/121
2001/0023759 A1 *  9/2001 Katsui ................. 165/125
2002/0195231 A1 * 12/2002 Siu ................... 165/104.33
2003/0142477 A1 *  7/2003 Elias et al. ............ 361/700

* cited by examiner

*Primary Examiner*—Jayprakash Gandhi
*Assistant Examiner*—Anthony Q Edwards
(74) *Attorney, Agent, or Firm*—Birch, Stewart, Kolasch & Birch, LLP (57) ABSTRACT

Disclosed is a cooler of a notebook personal computer allowing more much heat to be rapidly discharged to the outside. The cooler includes: a heat absorbing part fan for absorbing heat generated from a heat generation device of the notebook personal computer; a cooling fan for blowing air in front and side directions; at least two heat pipes of which one ends are in contact with the heat absorbing part and the other ends extend to the front and side of the cooling fan; at least two heat radiation parts provided to be facially in contact with the other ends of the heat pipes; and a lower case having a plurality of grids provided at a corner portion facing the heat radiation parts, from which air heated by the heat generation parts is forcibly discharged.

9 Claims, 7 Drawing Sheets

COOLER OF NOTEBOOK PERSONAL COMPUTER AND FABRICATION METHOD THEREOF

This nonprovisional application claims priority under 35 U.S.C. § 119(a) on Patent Application No. 2002-0012505 and 2003-0011469 filed in Korea on Mar. 8, 2002 and Feb. 24, 2003, which is herein incorporated by reference.

BACKGROUND OF THE INVENTION

1. Field of the Invention

The present invention relates to a notebook personal computer, and more particularly, to a notebook personal computer in which high temperature heat generated from a plurality of heat generation sources provided in the computer, for instance, a plurality of chips mounted on the main board, is rapidly discharged to the outside.

2. Discussion of the Related Art

Unlike the desktop computer, notebook personal computer has a slimmed structure but its performance has been advanced to a corresponding level to that of the desktop computer.

Due to the slimmed structure, the notebook personal computer causes drawbacks related with device and method for cooling a semiconductor chip exampled as the central processing unit (CPU) provided in the notebook personal computer. If the cooling-related drawbacks are not solved, a stable operation of the notebook personal computer cannot be anticipated. In particular, in case the CPU is not cooled, a fatal error may be caused in the use of the notebook personal computer.

A conventional cooler for a notebook personal computer will be described. The notebook personal computer includes a display part provided with an LCD panel, and a circuit part which is hinge-coupled with both ends of the display part and has a keyboard and a plurality of semiconductor chips. Hereinafter, the circuit part generating high temperature heat will be focusely described.

Figure 1:
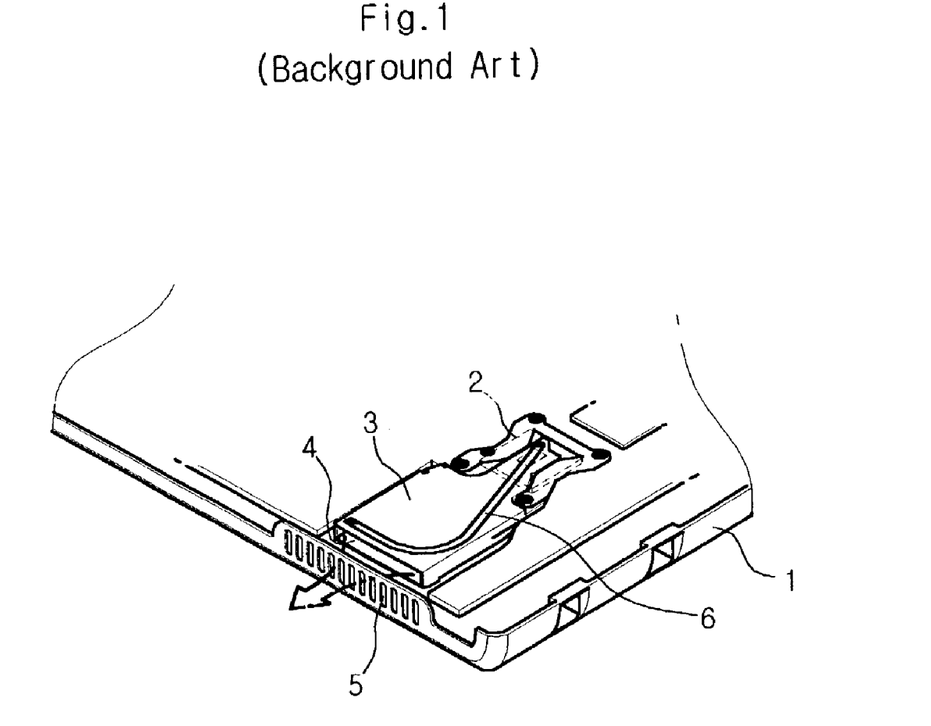
FIG. 1 is a perspective view showing an installation sate of a cooler for a conventional notebook personal computer.

FIG. 1 is a perspective view showing an installation gate of a cooler for a conventional notebook personal computer.

Referring to FIG. 1, a circuit part on which main heat generating part is located, includes a lower case 1 through which heated air discharged to the outside, a heat generating device 2 exampled as the CPU that is a core element of the computer formed on a main board, and a cooler for cooling high temperature heat of the heat generating device 2.

In particular, the cooler includes a heat pipe 6 for rapidly conduct heat, and a discharge hole 4 formed at one end side of the heat pipe and through which high temperature heat is discharged for the cooling. Also, at a side portion of the lower case 1 facing the discharge hole, a plurality of grids allowing the high temperature air discharged through the discharge hole to be discharged outside the lower case 1.

In detail, inside the cooler 3, a cooling fan for absorbing a comparatively cool air and discharging the absorbed cool air toward the discharge hole is further formed. At an opened face of the discharge hole 4, a plurality of cooling fins allowing the heat conducted through the heat pipe 4 to be rapidly discharged may be further formed.

An operation of the conventional cooler of the notebook personal computer constructed as above is described below. High temperature heat of the heat generating device 2 is transferred to the discharge hole 4 by a self-conduction or a conduction through the heat pipe 6.

The discharge hole 4 cools high temperature heat of the cooling fins or the cooler 3 in a high temperature state by the conducted heat, through a convention of the cooling fan.

Meanwhile, the conventional cooler of the notebook personal computer can be more in detail reviewed from U.S. Pat. No. 6,351,382.

However, the conventional cooler of the notebook personal computer constructed as above has a drawback in that the high temperature heat of the heat generating device exampled as the CPU of the computer is not sufficiently cooled.

In concrete, the slim structure that is a restriction required in the notebook personal computer, makes it impossible to increase the size and capacity of the cooler 3 without any limitation.

Also, in case the rotational speed of the cooling tan provided in the cooler is increased in order to enhance the cooling efficiency of the cooler, a noise problem due to high speed air flow is caused, which is undesirable. In particular, the noise of the cooler acts as a fatal defect in the notebook personal computer having the portable characteristic.

SUMMARY OF THE INVENTION

Accordingly, the present invention is directed to a cooler of a notebook personal computer and fabrication method thereof that substantially obviates one or more problems due to limitations and disadvantages of the related art.

An object of the present invention is to provide a cooler of a notebook personal computer in which a high cooling efficiency is attained.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve this object and other advantages and in accordance with the purpose of the invention, as embodied and broadly described herein, a cooler of a notebook personal computer includes: a heat absorbing part fan for absorbing heat generated from a heat generation device of the notebook personal computer; a cooling fan for blowing air in front and side directions; at least two heat pipes of which one ends are in contact with the heat absorbing part and the other ends extend to the front and side of the cooling fan; at least two heat radiation parts provided to be facially in contact with the other ends of the heat pipes; and a lower case having a plurality of grids provided at a corner portion facing the heat radiation parts, from which air heated by the heat generation parts is forcibly discharged.

In an aspect of the invention, a cooler of a notebook personal computer, includes: a heat absorbing part fan for absorbing heat generated from a heat generation device of the notebook personal computer; a cooling fan formed at a corner portion of the notebook personal computer, for forcibly blowing air; at least two heat pipes of which one ends are in contact with the heat absorbing part and the other ends extend to the front and side of the cooling fan; at least two heat radiation parts provided to be facially in contact with the other ends of the heat pipes, formed at a side portion of the cooling fan such that air blown from the cooling fan passes through, and made of Styrofoam aluminum; and a lower case having a plurality of grids provided at a corner portion facing the heat radiation parts, from which air heated by the heat generation parts is forcibly discharged.

In another aspect of the invention, a cooler of a notebook personal computer includes: a cooling fan formed at a corner portion of the notebook personal computer, for forcibly blowing air; a heat pipe of which one end is in contact with a heat absorbing part and the other end extends to the cooling fan; a heat radiation part provided to be facially in contact with the other end of the heat pipe, formed at front and/or side portion of the cooling fan such that air blown from the cooling fan passes through, and made of Styrofoam aluminum; and a lower case with which the heat radiation part is matched and closely in contact, having a plurality of grids provided at a corner portion with which the heat radiation part is closely in contact, from which air heated by the heat generation parts is discharged.

In a further aspect of the invention, there is provided a fabrication method of a cooler of a notebook personal computer. The method includes the step of: cutting a large-sized Styrofoam aluminum into a plurality of Styrofoam aluminums having a constant size; coupling the cut Styrofoam aluminums to a heat pipe; and mounting the heat pipe to which the cut Styrofoam aluminums are coupled, on the notebook personal computer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

First Embodiment

Figure 2:
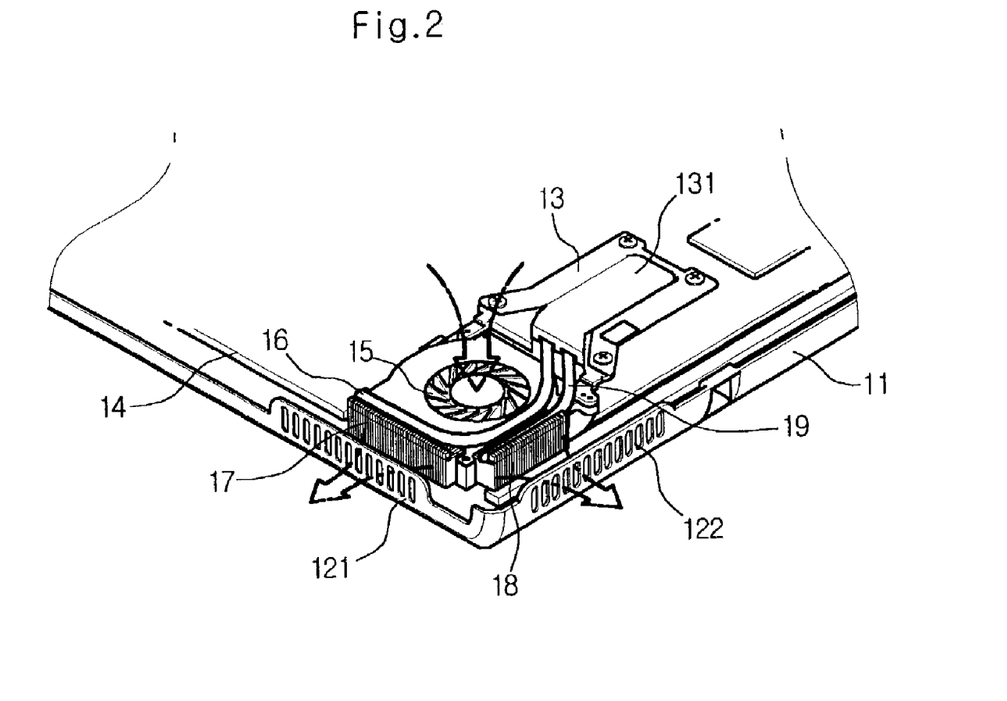
FIG. 2 illustrates an installation state of a cooler of a notebook personal computer according to a first embodiment of the present invention.
Figure 3:
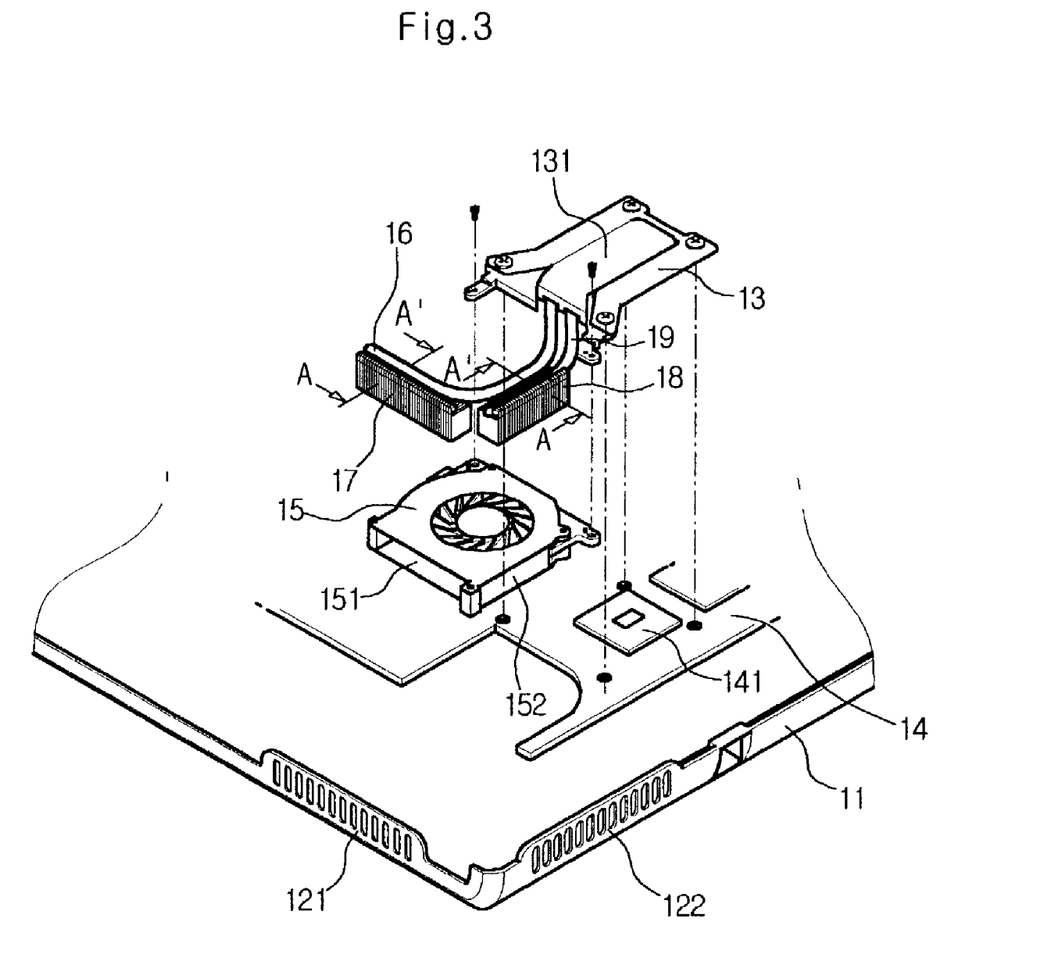
FIG. 3 is an exploded perspective view of a cooler of a notebook personal computer according to a first embodiment of the present invention.
Figure 4:
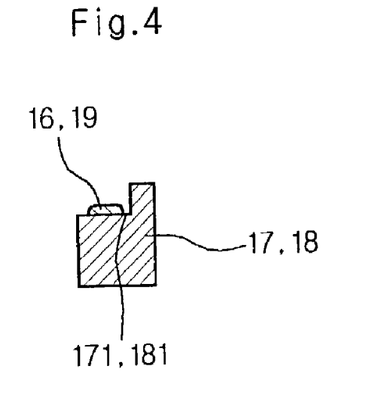
FIG. 4 is a sectional view taken along the line A-A' of FIG. 3.

A first embodiment according to the sprits of the present invention is shown in FIGS. 2, 3 and 4.

FIG. 2 illustrates an installation state of a cooler of a notebook personal computer according to a first embodiment of the present invention.

Referring to FIG. 2, a notebook personal computer according to a first embodiment of the present invention includes a lower case 11 forming a lower side portion of the circuit part, a main board 14 provided in the lower case 11 and on which a plurality of integrated circuits (ICs) including a central processing un it (CPU) are mounted, and a cooler provided at a corner portion of the lower case 11.

The cooler includes a cooling fan 15, a coupling part 13 fixedly installed on the main board 14, an absorbing part 131 for absorbing heat generated from a heat generating device mounted on the main board 14, heat pipes 16, 19 of which one ends extend from the heat absorbing part 131, for being conducted with high temperature heat from the heat absorbing part 131, a heat radiation part 17, 18 coupled to the other ends of the heat pipes 16, 19, and grids 121, 122 formed at a side of the lower case 11 facing the heat radiation part 17, 18, for allowing air to be flown.

In detail, the heat pipe includes a front heat pipe 16 and a side heat pipe 19 respectively extending in front and side directions for the cooling. Although the heat pipe includes at least two heat pipes, there is no difference in the substantial effect of the present invention.

The radiation part 17, 18 includes a front heat radiation part 17 formed to face the front heat pipe 16 and a side heat radiation part 18 formed to face the side heat pipe 19. Also, the heat radiation part 18 includes a plurality of metallic cooling fins formed in a plate shape to overlap with each other at constant intervals. The overlapping direction of the plate-shaped cooling fins is normal to the air flow direction to enhance the efficiencies of air circulation and convection.

The heat radiation parts 17, 18 are formed by the same number with the heat pipes 16, 19 to cool the respective heat pipes 16, 19. The grids 121, 122 are formed to face the heat pipes 16, 19 and the heat radiation parts 17, 18, and indicate a plurality of ventilation holes formed to penetrate the lower case 11.

Through both sides of the cooling fan 15, a comparatively cool air is absorbed and is then discharged to the outer circumference of blades by a centrifugal force by the rotation of the blades. Arrow in the drawing illustrates air flow by the cooling fan 15.

FIG. 3 is an exploded perspective view of a cooler of a notebook personal computer according to a first embodiment of the present invention.

Referring to FIG. 3, discharge holes 151, 152 through which air is discharged by a centrifugal force using the rotation of the blades are formed at the front and side of the cooling fan 125. The discharge holes 151, 152 include the front discharge hole 151 aligned with the front heat radiation part 17, and the side discharge hole 152 aligned with the side heat radiation part On the main board 14, there is mounted the heat generating device 141. The heat generating device 141 is configured to be aligned with the heat absorbing part 131 and rapidly discharge the high temperature heat outside the notebook personal computer. For this purpose, it is desirable that the CPU from which the most much heat is generated among the heat generating devices is arranged right below the heat absorbing part 131.

In the meanwhile, the coupling part 13 has a coupling construction in which individual coupling grooves are formed at four corners of the coupling part 13, screws are inserted into the coupling grooves, and the inserted screws are also inserted into and coupled to the main board 14. However, it is apparent that the coupling method between the coupling part 13 and the main board 14 is not restricted to the previously proposed construction and use of other coupling method such as bonding, rivet or the like is not excluded.

In addition, the cooling fan 15 is coupled with the coupling part 13 in such a coupling way that holes are formed in the coupling part 13 and the cooling fan 15, and screws are inserted into and fixed to the holes. In other words, the cooling fan 15 is fixedly coupled to the coupling part 13.

FIG. 4 is a sectional view taken along the line A-A' of FIG. 3.

Referring to FIG. 4, the heat radiation parts 17, 18 are coupled with the heat pipes 16, 19 in such a way that the cavely formed mounting grooves 171, 191 are formed in the upper surface of the heat radiation parts 17, 18, and the heat pipes 16, 19 are mounted on the mounting grooves 171, 181.

By the foregoing coupling constructions, it becomes possible that the heat pipes 16, 19 conduct more much heat to the heat radiation parts 17, 18, rapidly.

Preferably, the coupling between the heat radiation parts 17, 18 and the heat pipes 16, 19 are performed by a welding or soldering.

In the aforementioned constitution, the invention is characterized in that the plurality of heat pipes 16, 19 are formed, the heat pipes 16, 19 are respectively extended to the front and side of the cooling fan 15, and the respective heat radiation parts 17, 18 are formed at the outer circumferences of the heat pipes 16, 19.

According to the foregoing construction, the air generated from the cooling fan 15 is discharged from two portions of the outer circumference of the cooling fan 15, thereby enhancing the cooling efficiency. In other words, the invention is characterized in that at both sides of the approximately square-shaped cooling fan 15, the heat radiation parts are formed to thereby increase air amount discharged from the cooling fan 15, and the air is allowed to be in contact with more area, to thereby enhance the cooling efficiency.

Hereinafter, operations of the cooler of the notebook personal computer constructed as above will be described.

Referring to FIG. 3, high temperature heat is generated from the heat generating device mounted on the main board 14, for example, the CPU 141 due to many operations. The heat generated as above is transferred to the heat absorbing part 131, the heat transferred to the heat absorbing part 131 is transferred to one ends of the heat pipes 16, 19, and the heat is again rapidly transferred to the other ends of the heat pipes 16, 19 by a rapid heat conduction therein. Resultantly, the heat of the heat generating device is rapidly transferred to the other ends of the heat pipes 16, 19.

The heat transferred to the heat pipes 16, 19 are transferred to the heat radiation parts 17, 18, and the heat radiation parts 17, 18 heated by the transferred heat are cooled by a convection due to air flow blown from the cooling fan 15.

Reviewing the convention by the cooling fan 15 in an aspect of air flow, the cooling fan 15 absorbs outer air from its approximate center portion. The absorbed outer air is pushed out to the outer circumference by the centrifugal force applied by the blades of the cooling fan 15, and the pushed outer air is discharged through the discharge holes 151, 152. While the outer air is discharged by the cooling fan 15, the outer air passes through the heat radiation parts 17, 18. Also, while the outer air passes through the heat radiation parts 17, 18, it absorbs high temperature heat by the convention to discharge the absorbed high temperature heat outside the notebook personal computer.

Again reviewing the air flow operated as above, since the air discharge by the cooling fan 15 is carried out at two side portions, more rapid and mass cooling can be performed. In other words, the discharge holes occupy half and more of the outer circumference of the cooling fan 15 with respect to the cooling fan 15.

Experimentally comparing the cooler of the notebook personal computer according to the present invention with the conventional one, in spite of use of the same cooling fans, it was observed that an approximately 20% of cooling efficiency increases.

Also, as the discharge amount of the high temperature air to the outside increases, air pressure decreases, and it is anticipated that the decrease of the inner air pressure decreases the noise caused by the rotation of the cooling fan.

Second Embodiment

Figure 5:
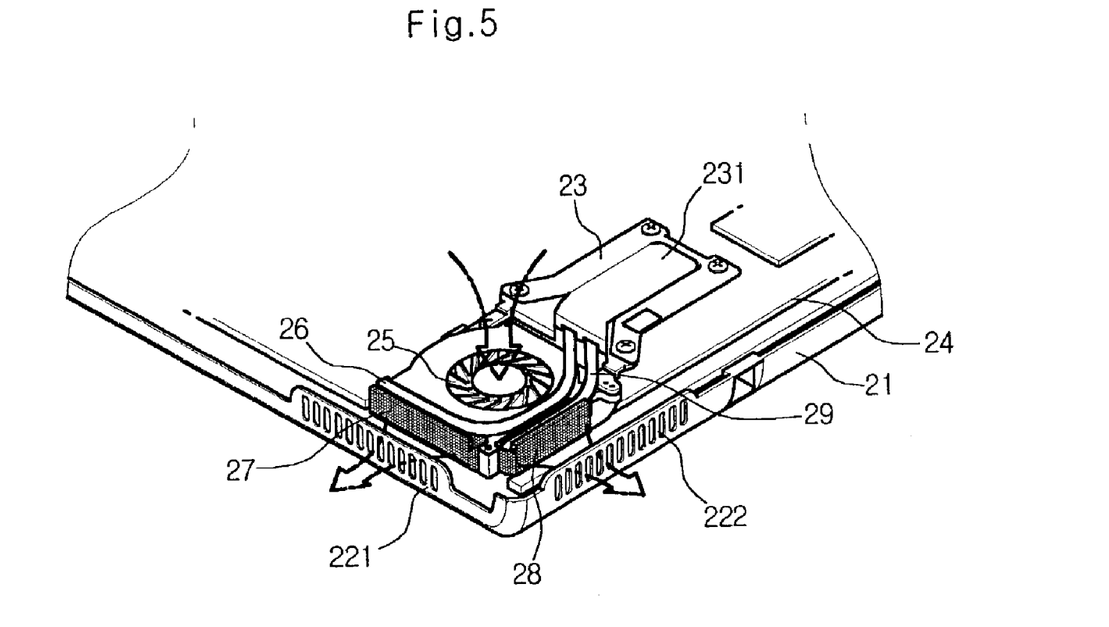
FIG. 5 illustrates an installation state of a cooler of a notebook personal computer according to a second embodiment of the present invention.
Figure 6:
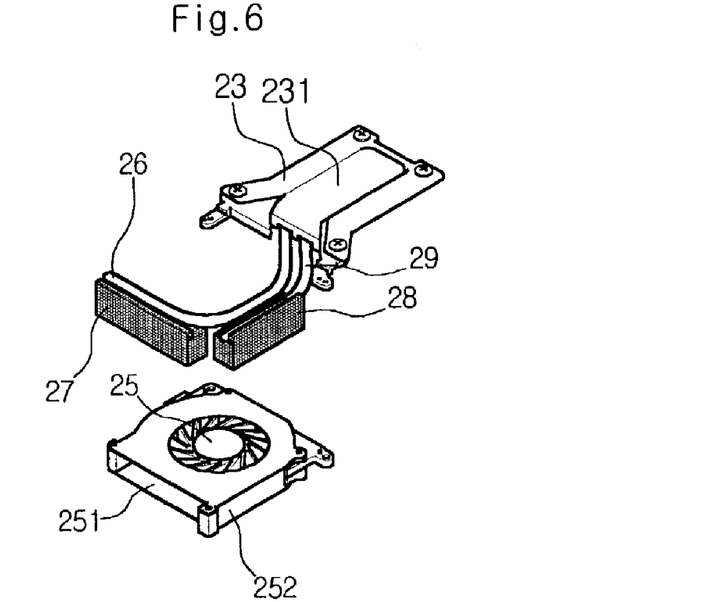
FIG. 6 is an exploded perspective view of a cooler of a notebook personal computer according to a second embodiment of the present invention.
Figure 7:
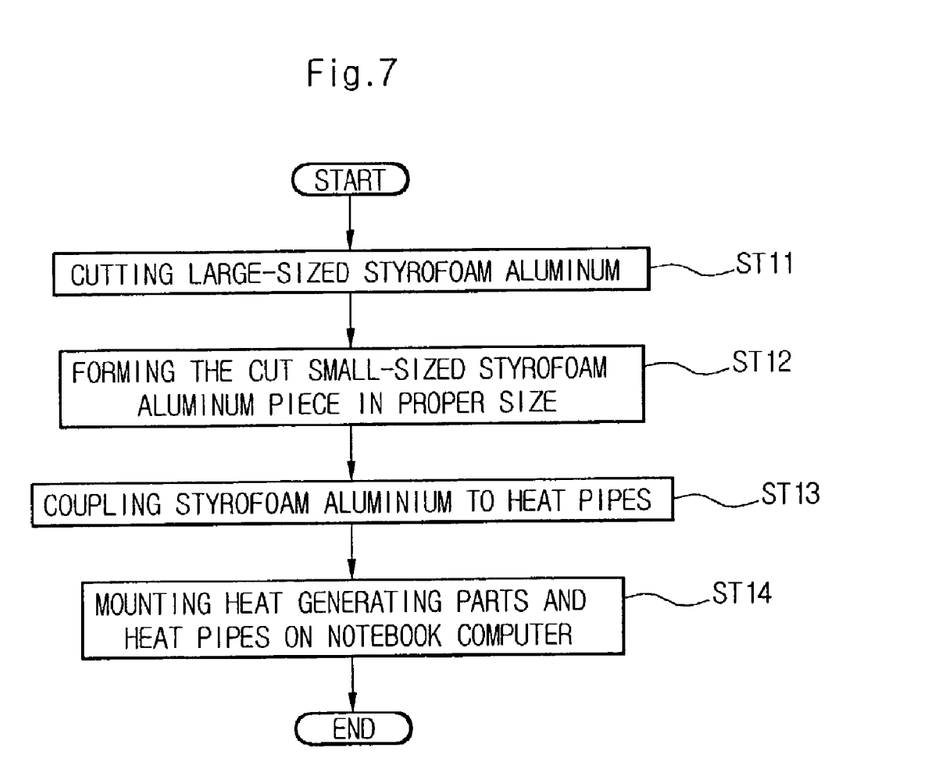
FIG. 7 is a flow chart illustrating a fabrication method of a cooler of a notebook personal computer according to an embodiment of the present invention.

FIGS. 5, 6 and 7 are views illustrating a second embodiment according to the same spirits of the invention.

Specifically, FIG. 5 illustrates an installation state of a cooler of a notebook personal computer according to a second embodiment of the present invention, and FIG. 6 is an exploded perspective view of a cooler of a notebook personal computer according to a second embodiment of the present invention. Referring to FIGS. 5 and 6, the second embodiment is the same in many portions as the first embodiment but has a difference in the heat radiation part than the first embodiment.

Specifically, comparing the second embodiment with the first embodiment shown in FIGS. 2 to 4, a lower case 21, a main board 24, a cooling fan 25, a coupling part 23, a heat absorbing part 231, heat pipes 26, 29, grids 221, 222, discharge holes 251, 252, a heat generating device 241, mounting grooves 271, 281 and the like are nearly the same in their constitutions and shapes as those of the first embodiment.

Only, the second embodiment has a difference in the constitution and shape of heat radiation parts 27, 28 than the first embodiment. In detail, in the first embodiment, the plurality of plate-shaped cooling fins are stack-arranged at regular intervals to form the heat radiation part. However, the present embodiment has a difference in that Styrofoam aluminum is processed to form a heat radiation part having a predetermined shape.

In detail, the front heat radiation part 27 and the side heat radiation part 28 are the same in their whole shape as the front heat radiation part 17 an the side heat radiation part 18, but they made of Styrofoam aluminum and have a simple forming process.

The Styrofoam aluminum is a lightweight material having a radiation area several tens times greater than the radiation area of the heat radiation part. So, the use of the Styrofoam aluminum for the heat radiation part helps to make the notebook personal computer lightweight and considerably enhance the cooling efficiency of the notebook personal computer.

FIG. 7 is a flow chart illustrating a fabrication method of a cooler of a notebook personal computer according to an embodiment of the present invention.

Referring to FIG. 7, the conventional heat radiation part is formed by cutting a plate-shaped cooling fin into several pieces and stacking the cut pieces. However, considering that the Styrofoam aluminum is made in a single product having a large size, it is first cut to have a proper size (ST11). The cut small-sized Styrofoam aluminum pieces are combined and formed in a proper size (ST12).

The formed Styrofoam aluminum is coupled with the heat pipes 26, 29. The heat pipes 26, 29 and the Styrofoam aluminum can be firmly coupled to each other by a welding or soldering method (ST13).

A mounting process for mounting the heat generating parts 27, 28 and the heat pipes 26, 27 is carried out in a state that the heat generating parts 27, 28 of Styrofoam aluminum are coupled with the heat pipes 26, 29 (ST14). Meanwhile, in the aforementioned forming process, it the Styrofoam aluminum can be made into the heat radiation parts 27, 28 having a specific shape during the step (ST11) in which the Styrofoam aluminum is cut or during the fabrication process of the Styrofoam aluminum, the step (ST12) of forming the Styrofoam aluminum may be deleted. It is apparent that this method also belongs within the spirit of the invention.

According to the aforementioned process, there is an advantage in that the heat radiation parts 27, 28 can be formed more easily. Also, there is another advantage in that worker's labor is saved.

Third Embodiment

Figure 8:
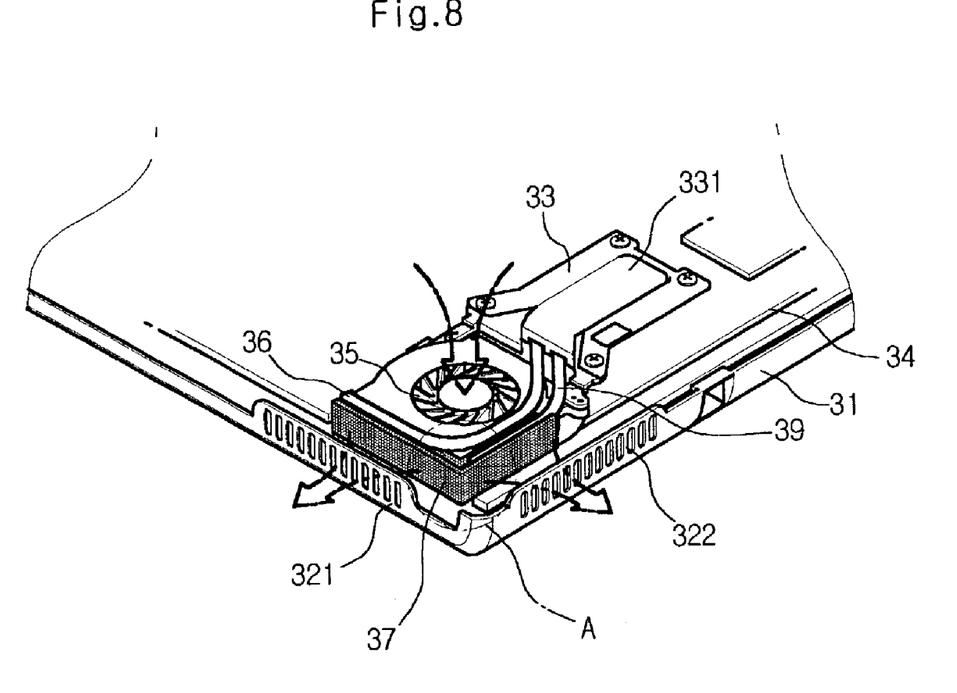
FIGS. 8 and 9 are schematic views illustrating the constitutions of a third embodiment according to the present invention.
Figure 9:
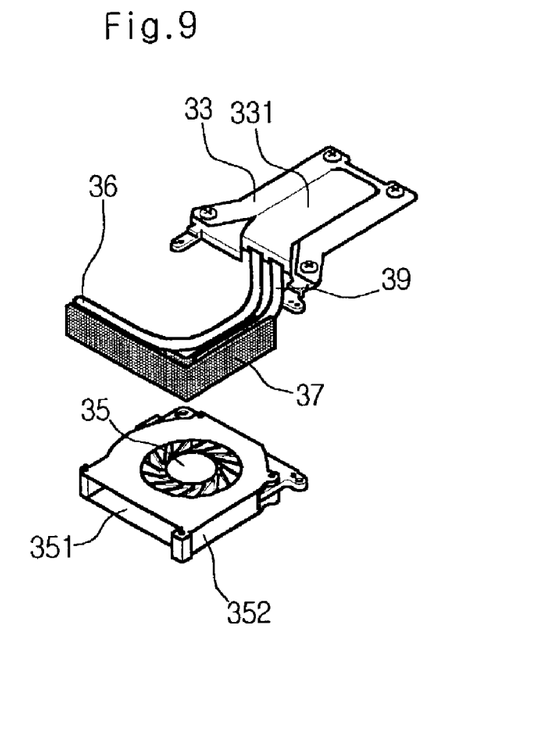

FIGS. 8 and 9 are schematic views illustrating the constitutions of a third embodiment according to the present invention.

The third embodiment of the invention is the same in its many portions as the second embodiment but has a difference in the heat radiation part formed of Styrofoam aluminum than the second embodiment. In other words, a lower case 31, a main board 34, a cooling fan 35, a coupling part 33, a heat absorbing part 331, heat pipes 36, 39, grids 321, 322, discharge holes 351, 352, a heat generating device, mounting grooves and the like are nearly the same in their constitutions and shapes as those of the second embodiment, but a heat radiation part 37 has a difference in its constitution than that of the second embodiment.

In detail, the heat radiation part 37 formed of Styrofoam aluminum of the present embodiment is characterized in that the front heat radiation part 27 and the side heat radiation part 28 shown in the second embodiment are formed in a single body. In other words, the heat radiation parts having the same section are integrally formed.

In other words, the front heat radiation part 27 and the side heat radiation part 28 that are separatedly formed in the second embodiment are made in the single heat radiation part 38, to thereby simplify the fabrication process of the radiation part 37. Also, since the heat radiation part can be formed even in the corner portion (A) where the heat radiation part are not formed in the second embodiment, it is possible to further enhance the cooling efficiency.

Herein, the forming process of the cooler is omitted since its detailed description is the same as that of the second embodiment.

Thus, by changing the shape of the heat radiation part 37 and forming the heat radiation part of Styrofoam aluminum according to the changed shape, it is possible to enhance the work efficiency. Also, since the portion for performing the cooling is extended to the corner portion (A), it is possible to maximize the cooling efficiency.

Fourth Embodiment

Figure 10:
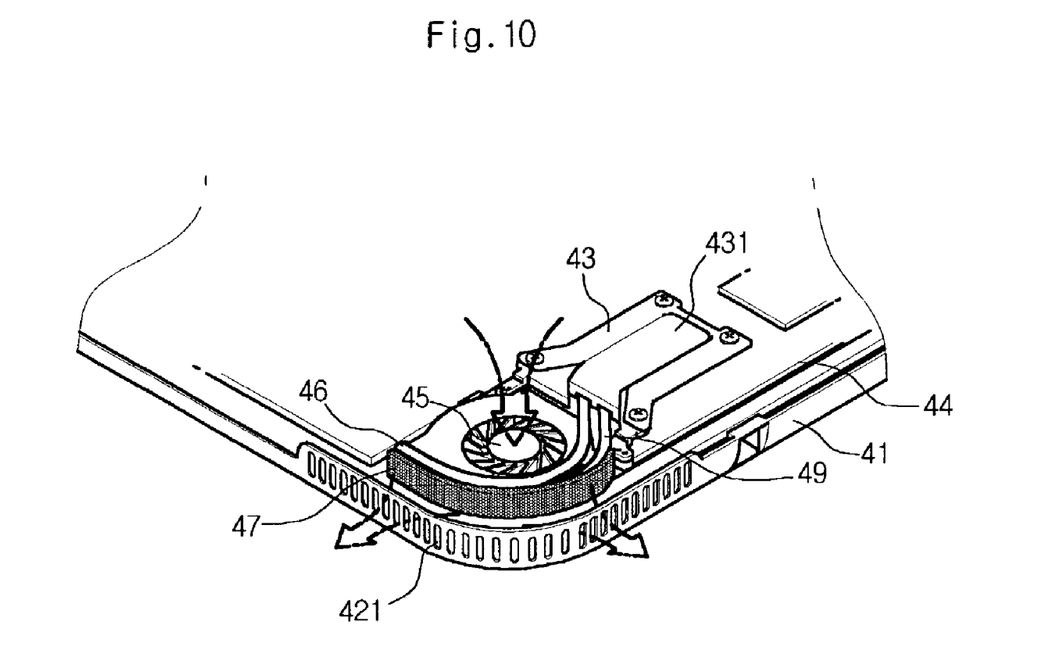
FIGS. 10 and 11 are schematic views illustrating the constitutions of a fourth embodiment according to the present invention.
Figure 11:
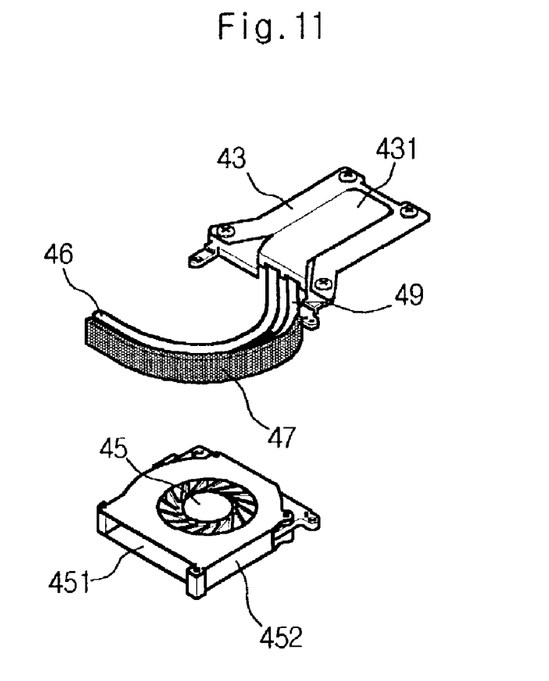

FIGS. 10 and 11 are schematic views illustrating the constitutions of a fourth embodiment according to the present invention.

The fourth embodiment of the invention is the same in its many portions as the third embodiment but has difference in the heat radiation part formed of Styrofoam aluminum and the shape of the corner portion of the lower case than the third embodiment. In other words, a main board 44, a cooling fan 45, a coupling part 43, a heat absorbing part 431, heat pipes 46, 49, grids 421, discharge holes 451, 452, a heat generating device, mounting grooves and the like are nearly the same in their constitutions and shapes as those of the second embodiment, but a heat radiation part 47 and a lower case 41 have differences in their constitutions than that of the second embodiment.

In detail, the heat radiation part 47 is formed in a fan shape as a whole. In other words, the overall shape of the heat radiation part 47 is slightly rounded, so that heat exchange can be performed throughout wider area by the air discharged from the cooling fan 45. Also, the corner portion of the lower case 41 is rounded to further enhance the cooling efficiency by the heat radiation part 47.

Herein, the forming process of the cooler is omitted since it is the same as that of the third embodiment.

However, even when discharge holes facing the heat radiation part 47 is rounded like the shape of the heat radiation part 47, there is no influence on the embodiments of the present invention. In other words, the same effect can be achieved if the discharge holes 451, 452 are not divided by predetermined partitions, but formed in a single body, and a portion of the discharge holes of the cooling pan are rounded.

Additionally, in case the cooling fan 45 is rounded like the shape of the lower case, there is an advantage that the notebook computer's inner space for the installation of the cooling fan 45 can be utilized more efficiently.

Figure 12:
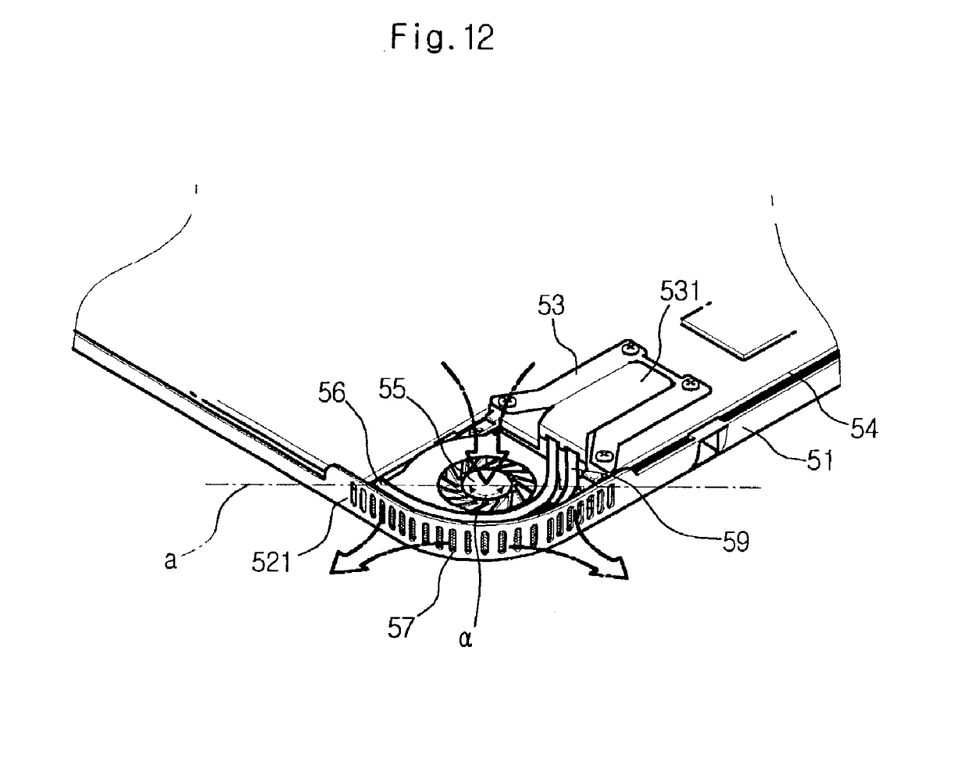
FIG. 12 is a schematic view illustrating the constitution of a fifth embodiment according to the present invention.

FIG. 12 is a schematic view illustrating the constitution of a fifth embodiment according to the present invention.

The fifth embodiment of the invention is the same in its many portions as the fourth embodiment. However, the fifth embodiment has difference in the lower case than the third embodiment. In other words, a main board 54, a cooling fan 55, a coupling part 53, a heat absorbing part 531, heat pipes 56, 59, grids 521, discharge holes, a heat generating device, mounting grooves and the like are nearly the same in their constitutions and shapes as those of the fourth embodiment, but a heat radiation part 57, a lower case 51 and the grids 521 have differences in their constitutions than that of the fourth embodiment.

Referring to FIG. 12, the heat radiation part 57 is completely and facially in contact with the corner portion of the lower case 51. In other words, the heat radiation part 57 is formed in the same shape as the corner portion of the lower case 51 and the heat radiation part 57 have an outer circumferential surface that is facially and closely in contact with an inner circumferential surface of the lower case 51. Additionally, the lower case 51 has a plurality of grids provided at an overall corner portion, from which air is easily discharged through the heat radiation part 57.

In other words, the cooler of the present invention includes the grids 521 formed at an overall corner portion of the lower case 51, and the heat radiation part 57 having the same outer circumferential face as the inner circumferential surface of the grids 521.

Further, referring to a one-dot chain line a indicating the range in which the heat radiation part 57 is formed around the cooling fan 55, the heat radiation part 57 covers more than half of the cooling fan 55, that is, a forming angle (α) of beyond 180°, thereby improving a cooling efficiency much more.

Because of these shapes, the cooling efficiency due to the heat radiation part 57 can be improved much more and a size of the notebook computer can be reduced.

The forming process of the cooler is omitted since it is the same as that of FIG. 4.

As described above, in the cooler of the notebook computer according to the present invention, an efficiency of the cooler installed within the notebook computer can be remarkably improved.

Furthermore, the cooler of the present invention can attribute to making the notebook more small-sized and thinner and reduce noise due to an operation of the cooling fan.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A cooler of a notebook personal computer, comprising:
   a heat absorbing part fan for absorbing heat generated from heat generation parts of the notebook personal computer;
   a cooling fan for blowing air in front and side directions through a heat radiator;
   at least two heat pipes of which one ends are in contact with the heat absorbing part and the other ends extend to the front and side of the cooling fan;
   the heat radiator comprising at least two heat radiation parts through which air is blown by the cooling fan and provided to be facially in contact with the other ends of the heat pipes; and
   a lower case having a plurality of grids provided at a corner portion facing the heat radiation parts, from which air heated by the heat generation parts is forcibly discharged wherein the heat radiation part is of foam aluminum, and the heat radiation parts have an outer circumferential surface that is facially and closely in contact with an inner circumferential surface of the corner portion of the notebook personal computer facing the heat radiation parts, and wherein the heat radiation parts are formed at half or more of outer circumferential surfaces of front and side surfaces of the cooling fan.

2. The cooler according to claim 1, wherein the heat radiation part comprises a cavely formed mounting groove on which the heat pipe is mounted to effectively conduct heat.

3. The cooler according to claim 1, wherein the heat radiation parts are a single body which is concurrently in contact with the plurality of heat pipes.

4. The cooler according to claim 1, wherein the heat radiation parts are roundly formed.

5. A cooler of a notebook personal computer, comprising:
   a heat absorbing part fan for absorbing heat generated from a heat generation parts of the notebook personal computer;
   a cooling fan having front and side exhaust openings located at a corner portion of the notebook personal computer, for forcibly blowing air;
   at least two heat pipes of which one ends are in contact with the heat absorbing part and the other ends extend, respectively, to the front and side of the cooling fan;
   at least two heat radiation parts provided to be facially in contact with the other ends of the heat pipes, located at a respective front and side exhaust opening portion of the cooling fan such that air blown from the cooling fan passes therethrough, and made of foam aluminum; and
   a lower case having a plurality of grids provided at a corner portion facing the heat radiation parts, from which air heated by the heat generation parts is forcibly discharged wherein the heat radiation parts and the corner portion are rounded, and the outer surface of the heat radiation part is closely and facially in contact with the corner portion, and wherein the heat radiation parts are formed at half and more of an outer circumference of the cooling fan around the cooling fan.

6. The cooler according to claim 5, wherein the grids are continuously formed.

7. The cooler according to claim 5, wherein the heat radiation parts are formed at half and more of an outer circumference of the cooling fan around the cooling fan.

8. A cooler of a notebook personal computer, comprising:
   a cooling fan formed at a corner portion of the notebook personal computer, for forcibly blowing air;
   a heat pipe of which one end is in contact with a heat absorbing part and the other end extends to the cooling fan;
   a heat radiation part provided to be facially in contact with the other end of the heat pipe, formed at front and/or side portion of the cooling fan such that air blown from the cooling fan passes therethrough, and made of foam aluminum; and
   a lower case with which the heat radiation part is matched and closely in contact, having a plurality of grids provided at a corner portion with which the heat radiation part is closely in contact, from which air heated by the heat generation parts of the computer is discharged wherein the foam aluminum is roundly formed, and wherein the heat radiation part is formed on an outer circumference covering half and more of the outer circumference around the cooling fan.

9. The cooler according to claim 8, wherein the corner portion is roundly formed.

* * * * *